(No Model.)
J. C. ROBINSON.
REVOLVING HARROW.
No. 304,959. Patented Sept. 9, 1884.
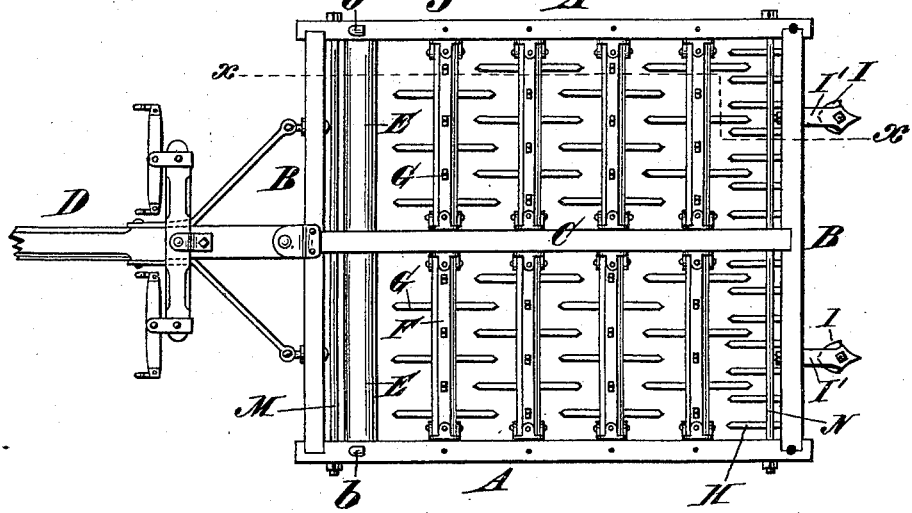
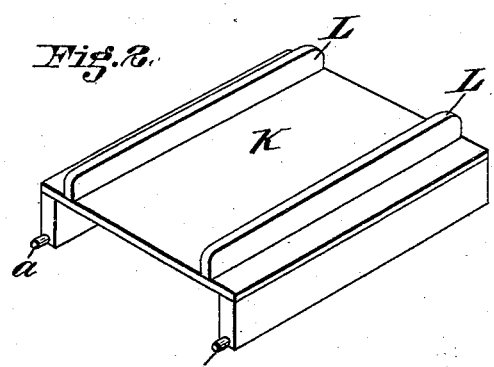
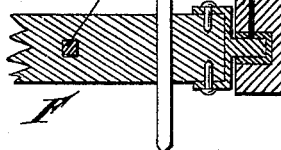
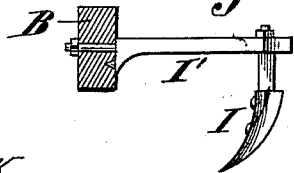
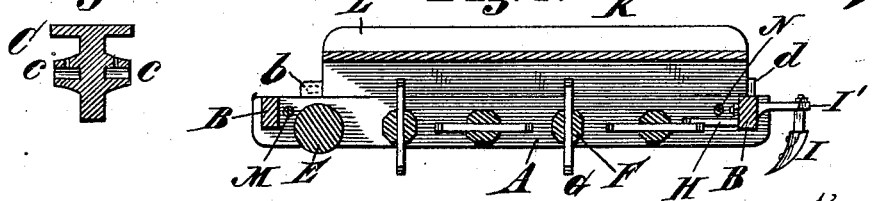
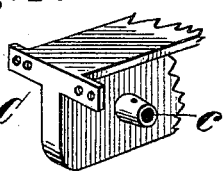
Attest
Jno. E. Jones
A. Gluchowsky
Inventor
Jacob C. Robinson
by Wood & Boyce
his Attorneys &c.

UNITED STATES PATENT OFFICE.

JACOB C. ROBINSON, OF NICHOLASVILLE, KENTUCKY.

REVOLVING HARROW.

SPECIFICATION forming part of Letters Patent No. 304,959, dated September 9, 1884.

Application filed February 7, 1884. (No model.)

*To all whom it may concern:*

Be it known that I, JACOB C. ROBINSON, a citizen of the United States, and a resident of Nicholasville, in the county of Jessamine and State of Kentucky, have invented certain new and useful Improvements in Harrows, of which the following is a specification.

My invention relates to an improved revolving toothed harrow.

The object of my invention is to provide a strong and durable machine which will properly prepare the soil for planting, as well as for harrowing in the sown seed.

The invention consists in the construction and combination of devices hereinafter described and claimed, reference being had to the accompanying drawings, in which—

Figure 1 is a plan view of my invention. Fig. 2 is a perspective view of the detachable cover. Fig. 3 is a longitudinal sectional elevation on line $y\ y$, Fig. 1. Fig. 4 is a broken transverse section of one of the rollers journaled in the frame. Fig. 5 is an elevation of one of the markers, the frame-bar to which it is attached being in section. Fig. 6 is a perspective view of one end of the division-rail and one of the roller-journal boxes. Fig. 7 is a central cross-section of the same through the journal-box.

A A represent the side rails of the harrow; B B, the front and rear rails; C, a division-rail; D, a tongue for drawing the machine; E, breaking-rollers journaled at their ends to the rails A A and C.

F represents revolving shafts journaled to the frame, and armed with teeth G, for cultivating the soil. These rollers F and teeth G are arranged so that the teeth of the front roller project past the teeth of the roller next in rear, which are set zigzag, so as to pass each other in opposite directions during each revolution and act as cleaners one for the other.

H represents a stationary set of teeth affixed to the rear frame-bar B in such a manner as to act as cleaners for the teeth of the roller next in front thereof.

I represents marker-teeth, which are attached to brackets or arms I′, affixed to the rear rail of the machine. These markers are used for laying out rows for the planting of seed. They may be made detachable and adjustable for different widths of seed-rows. The plan shown in Fig. 1 represents a double or wide harrow.

In order to have the frame strong enough to resist the strain of the revolving teeth, I provide a center rail, C, which is made of metal, of T-form, and provided with laterally-projecting sockets $c$, which receive the journals of rollers E. The gudgeons of the rollers F may also be journaled in similar manner in sockets on the center rail, if desired, and this is preferable. This T-rail is made thin, so as to allow the ends of the rollers to come as near together as possible to prevent too great a distance of space between the teeth.

K represents a bed which serves as a cover for the harrow. It is secured to the frame by means of lugs or pins $a$, which engage in sockets $b$ and pins $d$ at the rear end of the bed, as shown in Fig. 3. This bed serves as a convenient place for the driver to stand or sit upon, protecting him from liability of being thrown upon or caught by the revolving teeth. It also allows the harrow to be weighted to suit different soils. This bed is provided with runners L upon the top face, as shown in Fig. 2, so that the harrow may be inverted and transported on the runners L without revolving the teeth G.

M N represent tie-rods passing transversely through the machine and rails A A, for holding the frame together, the rails B being connected to rails A by a rabbet-joint, so that the machine can be readily taken apart and shipped "knockdown."

I claim—

A harrow consisting of the side rails, A, and front and rear rails, B, the side rails having the sockets $b$ and detachable pins $d$, the revolving toothed rollers journaled on the side rails, and the box-cover K, having the runners L L, secured to one side of its covering-board, and provided at one end with the lugs $a$, substantially as and for the purposes described.

In testimony whereof I have hereunto set my hand.

JACOB C. ROBINSON.

Witnesses:
G. H. DOZIER,
A. B. DUNCAN.